United States Patent [19]

Sands

[11] 4,010,930
[45] Mar. 8, 1977

[54] TWO-WAY ROTARY PLUG VALVE

[75] Inventor: Robert E. Sands, Shelbyville, Ill.

[73] Assignee: Mueller Co., Decatur, Ill.

[22] Filed: Aug. 11, 1975

[21] Appl. No.: 603,282

[52] U.S. Cl. .............................. 251/314; 251/309; 251/DIG. 1; 251/209

[51] Int. Cl.² ......................................... F16K 5/04

[58] Field of Search .......... 251/309, 317, 315, 304, 251/312, 314, 205, 208, 209, 368, DIG. 1

[56] References Cited

UNITED STATES PATENTS

| 2,497,448 | 2/1950  | Grosboll        | 251/309 |
| 2,510,514 | 6/1950  | Mueller         | 251/317 |
| 2,547,116 | 4/1951  | Gould           | 251/309 |
| 2,547,831 | 4/1951  | Mueller         | 251/309 |
| 2,987,295 | 6/1961  | Schenk et al.   | 251/312 |
| 3,236,496 | 2/1966  | Rosenstein et al.| 251/368 |
| 3,542,337 | 11/1970 | Scaramucci      | 251/315 |
| 3,542,338 | 11/1970 | Scaramucci      | 251/315 |
| 3,794,297 | 2/1974  | Duer et al.     | 251/309 |
| 3,883,113 | 5/1975  | Kolb            | 251/209 |

Primary Examiner—William R. Cline
Assistant Examiner—H. Jay Spiegel
Attorney, Agent, or Firm—Cushman, Darby & Cushman

[57] ABSTRACT

A rotary plug valve having a plug member rotatable in a valve housing between an opened position and a closed position, the housing member having a valve seat therein with a first passage opening to the seat and a second passage opening to the seat, and sealing means such as an endless sealing ring and an endless groove encircling one of the openings of the first and second passages to the seat. The rotary plug valve is capable of two-way flow therethrough, and this is realized by providing the passage in the plug member which has the sealing means encircling its opening with a greater width in a plane transversed to the axis of rotation to the plug member than the width of the other passage. By such an arrangement the sealing ring when encircling the opening of the passage functioning as an inlet passage is not lifted from its groove upon closing of the valve as a metal to metal seal between the plug member and the seat of the housing member at the downstream end of the passageway in the plug member is created before a critical flow condition is reached, thus, alleviating the high velocity flow through the plug member which would cause a low pressure condition to exist around the unsupported portion of the sealing ring.

14 Claims, 17 Drawing Figures

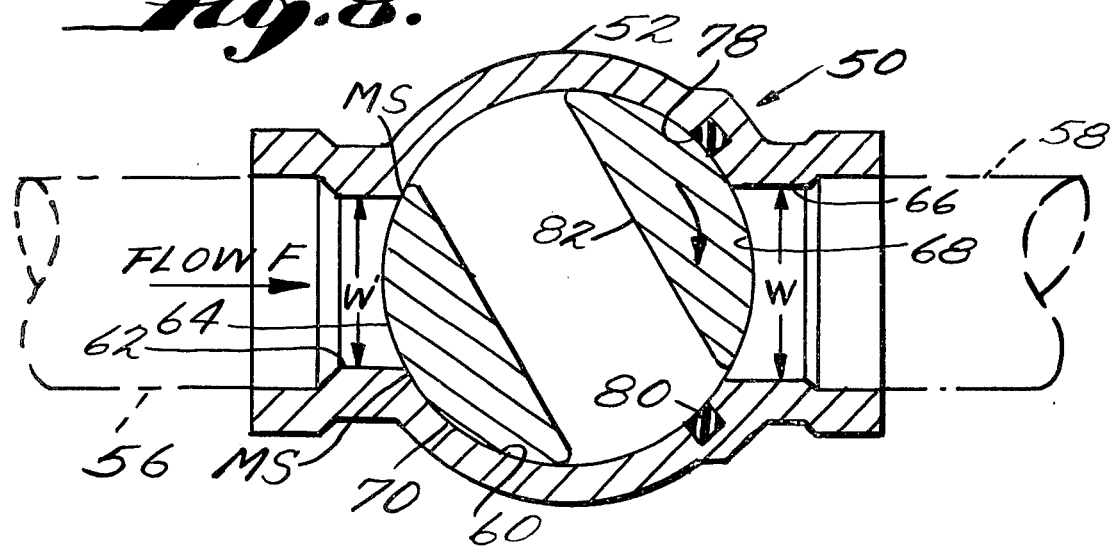
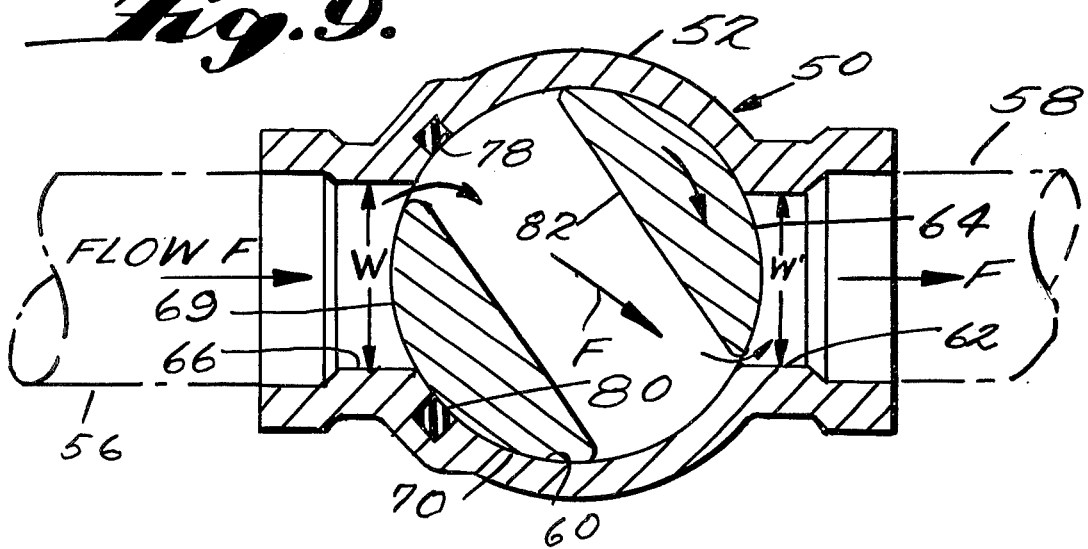
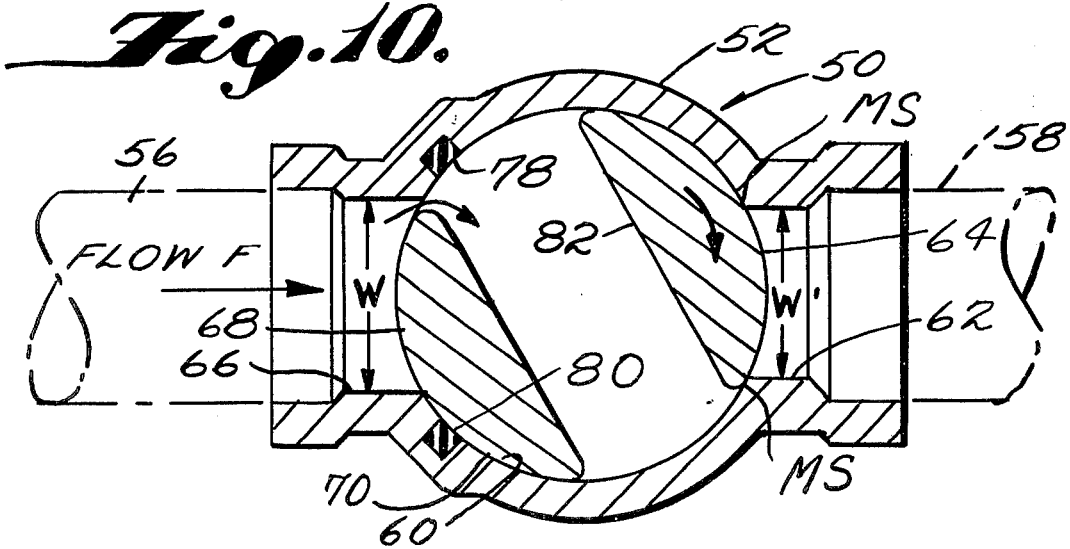

TWO-WAY ROTARY PLUG VALVE

The present invention relates to improvements in rotary plug valves or the like which are provided with a sealing ring on the surface of the valve seat and arranged to encircle one of the port openings of the passages in the housing member, the sealing ring sealing against the surface of the plug member when the plug member is moved to a position to fully close the valve. More particularly, the present invention relates to an improvement in such valves wherein the sealing ring is positioned on the surface of the seat of the housing member and may encircle either the upstream port opening of the housing member or the downstream port opening of the housing member, the arrangement being such that the valve is effectively a two-way valve in that flow of fluid through the valve may be in either direction without affecting the sealing ring during operation of the valve to cause the same to be clipped upon closing of the valve.

BACKGROUND OF THE INVENTION

Sealing rings such as O-ring seals or the like have been extensively used in rotary plug valves for sealing off the flow of fluid when the valve is moved to the closed position. These sealing rings have been provided either in a groove on the surface of the plug member of the valve or in a groove in the valve seat of the housing member.

When the sealing ring is provided in a groove on the surface of the valve plug member, the groove and its sealing ring are usually arranged to encircle the inlet port of the housing member when the valve is in the closed position, the theory behind such positioning of the sealing ring being that the upstream fluid pressure acting against the unsupported portion of the sealing ring crossing the inlet port of the valve housing member assists in holding the sealing ring in its groove. Problems of clipping the sealing ring have been encountered with such arrangements, especially when flow through the plug valve was in the reverse direction so that the sealing ring instead of encircling the inlet port was in fact encircling the outlet port. Many efforts have been made to solve the problem of the clipping of the sealing ring when it is positioned in a groove on the surface of the plug member, these efforts including arrangements to cam the sealing ring into its groove or to relieve the pressure differential across the unsupported part of the sealing ring.

When the sealing ring is located in a groove, encircling one of the ports in the housing member of a rotary plug valve it was usually arranged to encircle the downstream port opening, the theory being that the pressure of fluid through the valve was always acting on the sealing ring in a direction tending to hold the sealing ring in its groove. These types of plug valves have been successfully used for many years, wherein the valve is used to either fully open or close flow of fluid in the fluid line. However, these valves were not particularly successful wherein the valve was used as a "throttling valve" as the flow through the valve when in the throttle position created a low pressure area around the unsupported portion of the sealing ring causing it to lift slightly from its seat so that it could be clipped upon rapid closing. Also, this type of valve could not be used as a two-way valve wherein the sealing ring encircles the upstream port opening of the housing member in certain flow conditions and the downstream port opening in other flow conditions. If the sealing ring encircled the inlet or upstream port opening of the housing member and the plug member is being moved to the fully closed position, a rapid flow of fluid through the plug member causes a critical condition to occur just before closing as it creates a low pressure area about the unsupported portion of the sealing ring and, if there is high pressure beneath the sealing ring, the same is lifted from its groove and is clipped. If the sealing ring encircled the downstream or outlet port opening of the housing member and the valve was used as a "throttling valve," there was also present the danger of clipping of the sealing ring upon full closing of the valve.

In an effort to make the rotary plug valve a two-way valve and to eliminate some of the problems mentioned above, either the plug member or the valve seat in the valve housing member was provided with two sealing rings. If the plug was provided with two sealing rings which would surround both the inlet port opening and the outlet port opening of the housing member when the valve was closed, it was thought that this would eliminate the problem of leaking since the arrangement would insure that there would always be a sealing ring surrounding the inlet port regardless of which way the valve assembly was inserted into the fluid pressure line. This same reasoning applied when two sealing rings were carried in the valve seat, one surrounding one port opening and the other surrounding the other port opening. However, these types of arrangements were not entirely satisfactory because the one of the sealing rings not arranged in the desired location would be subject to clipping during operation of the valve and this would interfere with the proper opening and closing of the valve.

The problem of clipping or shearing of sealing rings in rotary plug valves for fluid distribution lines such as gas, water, chemicals or the like has been a constant source of trouble in the industry and many efforts have been made to try and obviate the problem. The present invention which will appear later in the specification under the heading "BRIEF SUMMARY OF THE INVENTION" as well as "DETAILED DESCRIPTION OF THE INVENTION," provides a solution which makes rotary plug valves completely serviceable for flow of fluid in both directions without clipping or shearing of the sealing ring. The present invention also results in a rotary plug valve which may not only be used as an on or off valve but also as a throttling valve.

PRIOR ART

Prior arrangements relating to but not suggesting the present invention are disclosed in the following United States Patents:

| NUMBER | NAME | DATE |
| --- | --- | --- |
| 2,497,448 | GROSBOLL | February 14, 1950 |
| 2,510,514 | MUELLER | June 6, 1950 |
| 2,547,116 | GOULD | April 3, 1951 |
| 2,547,831 | MUELLER | April 3, 1951 |
| 3,542,337 | SCARAMUCCI | November 24, 1970 |

BRIEF SUMMARY OF THE INVENTION

The present invention is an improvement in rotary plug valves having an endless sealing ring mounted in an endless groove on the valve seat and encircling one of the port openings of the passages in the housing member, the rotary plug valve being capable of use as a throttling valve or of use as a two-way fluid flow valve without the possibility of clipping or shearing the sealing ring upon closing of the valve. In this respect the sealing ring mounted in an endless groove in the valve seat and encircling one of the port openings of the passages in the valve housing member is capable of being around the port opening when acting as either an upstream or inlet port or downstream or outlet port.

In the broadest aspect of the present invention, a rotary plug valve is provided with a housing member having a valve or plug seat therein and a first passage having a port opening to the valve seat and a second passage also having a port opening to the valve seat. The plug member of the rotary plug valve having a flow passageway therethrough is rotated on its axis in the valve seat between a fully opened position where its flow passageway aligns with the port openings of the first and second passages in the housing member and a closed position where the flow passageway in the plug member is out of alignment with the aforementioned port openings. The sealing means which includes an endless groove encircling one of the port openings of the first and second passages in the housing member and an endless sealing ring positioned in the groove functions properly regardless of whether the port opening is the upstream or inlet port opening or the downstream or outlet port opening because the passage in the housing member which has the sealing means encircling its port opening has a maximum width parallel to a plane transverse to the axis of rotation of the plug member greater than the maximum width of the other passage parallel to the same plane.

By such an arrangement as described above the plug member makes a metal to metal seal around the port opening of the passage not having the sealing ring encircling the same prior to the passageway in the plug member being fully closed off from the port opening having the sealing ring encircling the same. By stopping flow of fluid through the plug member before flow of fluid can reach a critical condition where the flow velocity through the plug has become relatively high and creates a low pressure condition on the exposed portion of the sealing ring, there is no chance of the unsupported portion of the sealing ring being lifted from its groove and clipped upon further closing of the plug member. In this respect, the unsupported portion of the sealing ring is not subject to low pressure which could result in a differential pressure across the sealing ring tending to lift the same out of the groove.

The present invention comtemplates utilizing a longitudinally extending notch in the wall of the passage having the sealing ring encircling its port opening to give the passage a maximum width greater than the maximum width of the other passage, this notch being provided in a checked valve, i.e., a valve where the plug member can only rotate 90° between opened and closed positions. Where the rotary plug valve is a checkless valve, i.e., a valve having a plug member which can rotate 360°, the passage is provided with oppositely disposed longitudinally extending notches.

Additionally, the present invention contemplates making the passage in the housing member having the greater width with an overall cross-sectional area greater than the cross-sectional area of the other passage. The first and second passages in the housing member may be of similar or different shapes in cross-section and they may be circular, noncircular, such as oval, elliptical or the like.

The sealing ring is preferably an O-ring and while improved results have been obtained in the rotary plug valve of the present invention using sealing rings made from rubber or rubber-like materials having the same Shore A Durometer rating as O-rings in the prior art rotary plug valves, the invention contemplates using an O-ring made of a stiffer material as the stiffness of the material assists in retaining the unsupported portion of the O-ring in its groove when the valve is being opened and closed.

The invention further contemplates having the passageway through the plug member with a width in a plane transverse to the axis of rotation of the plug member at least as great as the maximum width of the passage in the housing member having the smaller width and no greater than the maximum width of the passage having the sealing ring encircling its port opening. Also, the passageway through the plug should have at least at its port ends a cross-sectional shape similar to the cross-sectional shapes of the first and second passages in the housing member.

Other objects and advantages of the present invention will appear more fully from the review of the drawings and from the "DETAILED DESCRIPTION OF THE INVENTION" which will follow.

BRIEF DESCRIPTION OF THE DRAWINGS

FIG. 8 is a view similar to FIG. 7 but illustrating the plug member having a metal to metal seal around the upstream or inlet port opening while the passageway in the plug member is still in open communication with the downstream or outlet port opening of the housing member.

FIG. 9 is a horizontal sectional view similar to FIG. 7 but with the housing member having the sealing ring encircling the upstream, or inlet port opening of the passage in the same, there being flow through the passageway of the plug member.

FIG. 10 is a view similar to FIG. 9 but disclosing the metal to metal seal around the downstream or outlet port opening of the housing member so as to stop flow through the plug member prior to the passageway therein being out of communication with the upstream port opening.

DETAILED DESCRIPTION OF THE INVENTION

Figure 1:
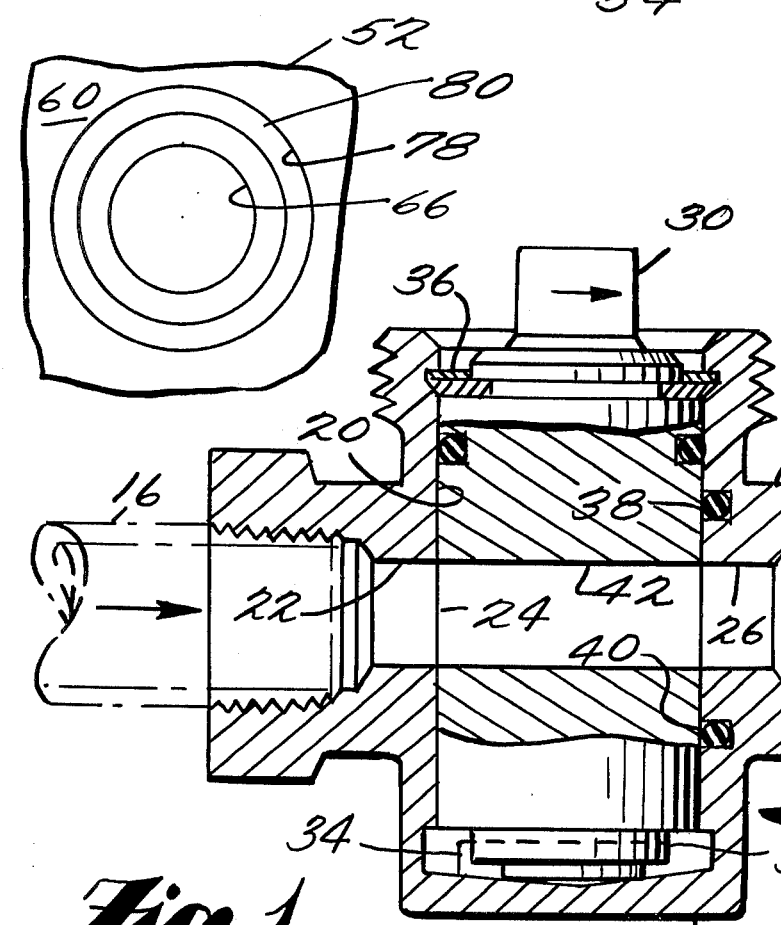
FIG. 1 is a vertical sectional view, partly in elevation, of a rotary plug valve of the prior art, the plug member being shown in the opened position and the sealing ring being shown encircling the downstream or outlet port opening of one of the passages in the housing member.
Figure 5:
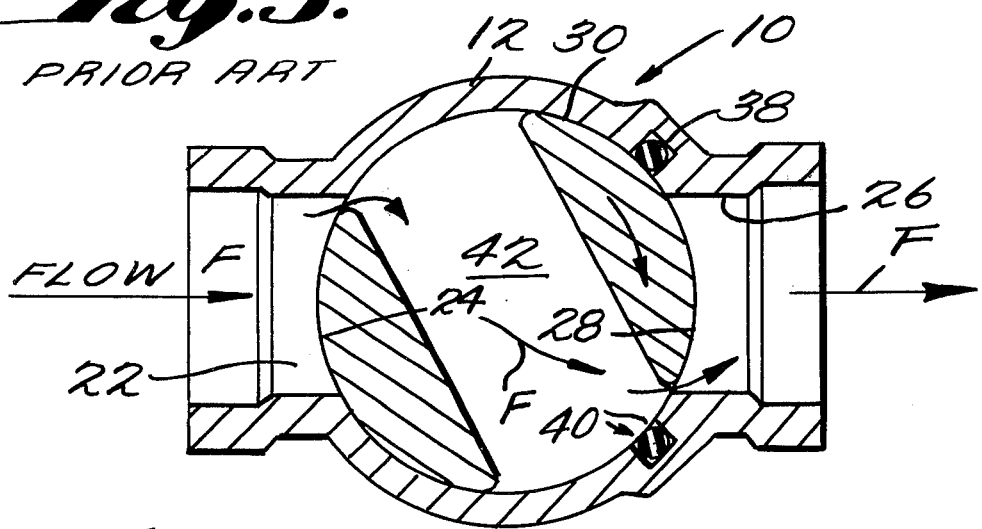
FIG. 5 is a horizontal sectional view through the prior art rotary plug valve of FIG. 1 but with the plug member being rotated towards the closed position.
Figure 6:
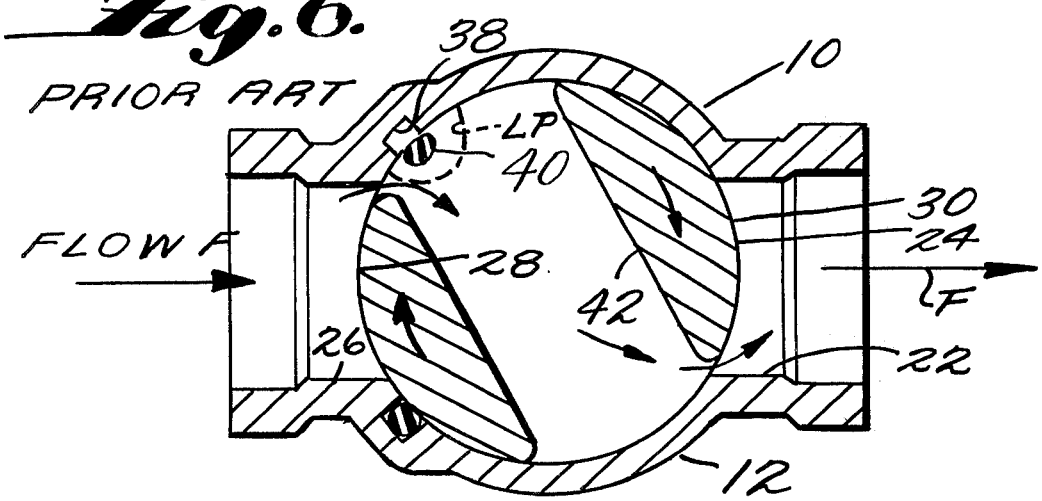
FIG. 6 is a horizontal sectional view similar to FIG. 5 but illustrating the prior art rotary plug valve with the sealing ring encircling the upstream or inlet port opening, the plug member approaching the closed position.

Referring now to the drawings wherein like characters or reference numerals represent like or similar parts, and, in particular to FIGS. 1, 5 and 6 there is illustrated a rotary plug valve generally designated at 10 of the type commonly known in the prior art. This rotary plug valve 10 has a housing member 12 with an integral closed bottom 14, the housing member being suitably connected to an upstream pipe 16 shown in broken lines and extending from a source of fluid pressure, such as water or gas main or the like and a downstream pipe 18 also shown in broken lines and extending to place of use, such as a dwelling or the like. The housing member 12 is provided with a cylindrically shaped valve seat 20, a first passage 22 opening to the valve seat in a port 24 and a second passage 26 diametrically opposed to passage 22 and opening to the valve seat in a port 28. The rotary plug valve 10 is provided with a plug member or key 30 having a passageway 42 therethrough, the plug member being rotatable in the valve seat 20 between the fully opened position and the fully closed position. In this respect, the rotary plug valve 10 is of the "checked" type as the plug member rotates only 90° since the plug member is provided at its end with an arcuate check lug 32 which cooperates with an arcuate flange 34. The plug member 30 is held in position in the housing member 12 by the usual retaining means 36.

In the prior art rotary plug valve 10 briefly described above the downstream port opening 28 of passage 26 is surrounded or encircled by a groove 38 which carries a sealing ring 40 preferably of the O-ring type. The passage 26 is identical in cross-sectional size and shape to the passage 22 as well as to the passageway 42 extending through the plug member. This type of prior art rotary plug valve has proved quite successful when properly used. In other words, so long as the rotary plug valve 10 is used as an on/off valve and so long as the O-ring is positioned around the downstream or outlet port, as shown in FIG. 5, little or no problems result. However, if the valve is used as a "throttling" valve, wherein the plug member is left in a partly cracked position for flow, a critical flow condition occurs due to the high velocity of fluid which results in a low pressure area being developed around the unsupported portion of the O-ring 40. When this occurs and the valve is then subsequently closed there is clipping of the O-ring.

However, a more serious condition occurs when the rotary plug valve 10 is inserted into a fluid distribution system in a manner where it is 180 degrees from that shown in FIGS. 1 or 5. In this situation the flow would be the reverse from that shown in FIG. 1 and would be similar to that shown in FIG. 6. It will be noted that the O-ring 40 now encircles the port opening 28 which is now acting as an upstream port opening. When the rotary plug valve is so inserted into a fluid line, problems result from not only using the valve as a "throttling" valve but also when the valve is used for its intended purposes as an off/on valve. FIG. 6 represents a view showing the plug member 30 being moved toward its closed position but it will be noted that there is still flow F of fluid through the passage 26, passageway 42 and passage 22. The flow of fluid reaches a critical condition because of its relatively high velocity and this develops a low pressure area LP around the exposed portion of the O-ring 40 and if there is high pressure beneath the O-ring 40 there is created a differential pressure across the O-ring which causes the same to be lifted from its groove and clipped by the port opening of the passageway 42 in the plug 30.

Figure 2:
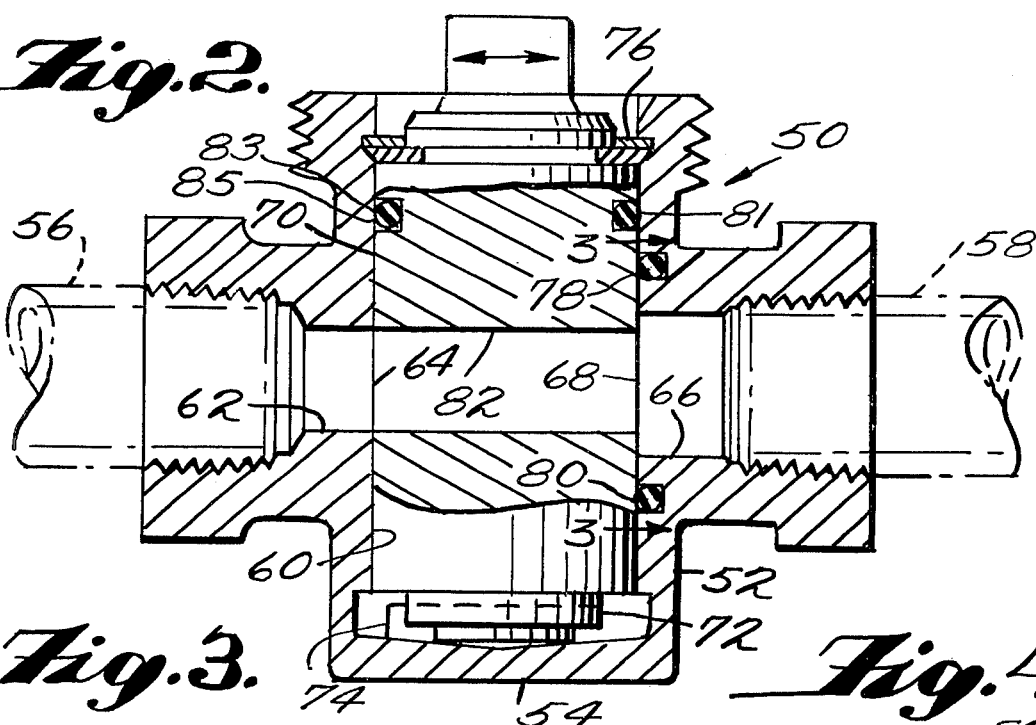
FIG. 2 is a vertical sectional view, partly in elevation, of a rotary plug valve similar to FIG. 1 but incorporating the present invention therein.
Figures 3, 4:
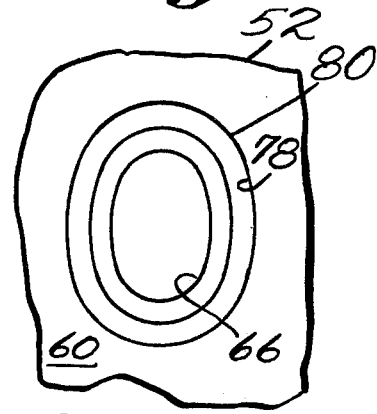
FIG. 3 is a view taken on the line 3—3 of FIG. 2, but the view being laid out in a flat plane, and illustrating the cross-sectional circular shape of one of the passages in the housing member.
FIG. 4 is a view similar to FIG. 3 but illustrating another shape of the cross-sectional area passages in the housing member.

Referring now to FIGS. 2 through 4 inclusive and 7 through 10 inclusive, there is disclosed a rotary plug valve assembly of the present invention generally designated at 50, the rotary plug valve having a housing member 52 with an integral closed bottom 54. This type of rotary plug valve is known as a "closed bottom" rotary plug valve but it is within the scope of the invention that the rotary plug valve may be of the type which is provided with a removable closure plug rather than the integral closed bottom. The housing member 52 is suitably connected to an upstream pipe 56 shown in broken lines and extending from a source of fluid pressure, such as a water or gas main or the like. A downstream pipe 58 also shown in broken lines extending to a place of use, such as a dwelling or the like is also connected to the housing member 52 and is generally diametrically opposite to the pipe 56. A cylindrically shaped valve seat 60 is provided in the housing member 52 and a first passage 62 opens to the valve seat in the port opening 64. A second passage 66 diametrically opposed to the passage 62 opens to the valve seat in a port opening 68. The rotary plug valve assembly 50 is provided with a plug member or key 70 having a passageway 82 therethrough, the plug member being rotatable in the valve seat 60 between the fully opened position and the fully closed position. In this respect, the rotary plug valve 50 illustrated is of the "checked" type as the plug member rotates only 90 degrees since the plug member is provided at its end with an arcuate lug 72 which cooperates with an arcuate flange 74 provided on the integral bottom 54. The plug member 70 is held in position in the housing member 52 by the usual retaining means 76.

While the valve seat 60 and the plug member 70 are disclosed as cylindrical, it will be appreciated by those skilled in the art that the valve seat and plug member could be of the tapered type, or for that matter, the plug member could be of the ball type with the valve seat spherically shaped. Additionally, while the present invention as shown in FIGS. 2 through 4 and 7 through 10 discloses a "checked" valve, it could be a "checkless" valve in which the rotary plug member has a full 360° rotation.

The port opening 68 to the valve seat 60 is shown in FIG. 2 as a downstream port opening. The valve seat 60 is provided with an endless groove 78 surrounding or encircling the port opening 68, the groove 78 carrying a sealing ring 80. The rotary plug valve 50 is provided with sealing means 81 between the plug member 70 and the valve seat 60 just below the plug retaining means 76, this sealing means including a groove 83 either in the plug member 70 or in the seat 60, the groove receiving an O-ring 85.

Figure 7:
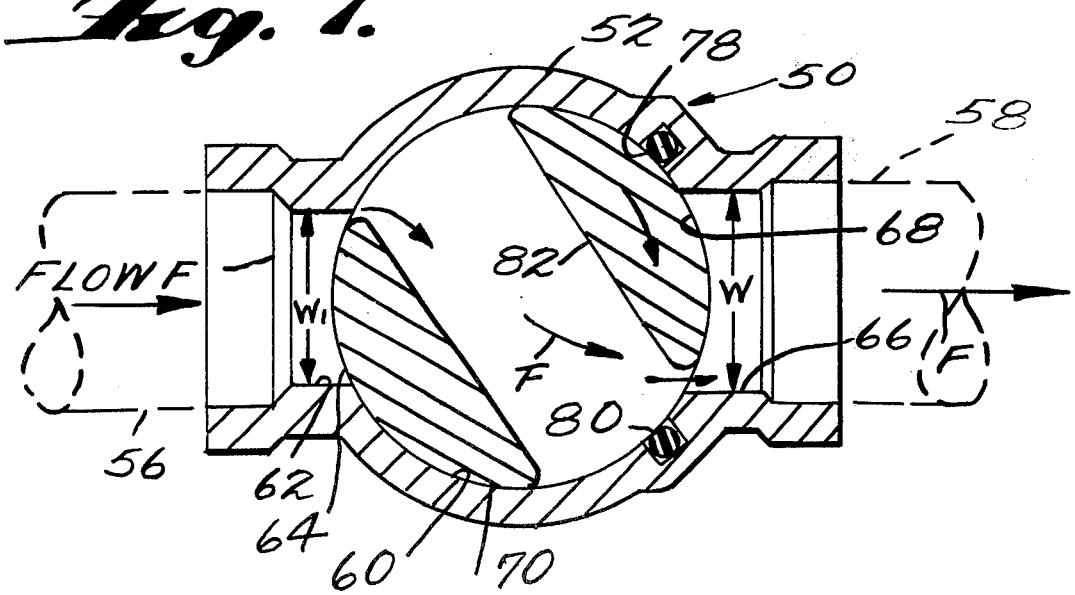
FIG. 7 is a horizontal sectional view through the rotary plug valve of the present invention with the O-ring shown encircling the downstream or outlet port opening of the passage in the housing member, the plug member being in a position where there is still flow through the same upon closing.

As shown in FIG. 2 as well as in FIGS. 7 and 8, the passage 66 in the housing member 52 has a larger cross-sectional area than the diametrically opposed passage 62. Additionally as shown in these figures the cross-sectional area of the passageway 82 through the plug member 70 is at least as great as the cross-sectional area of the passageway 62. In the arrangement disclosed in FIG. 2 as well as FIGS. 7 and 8 the passages 62 and 66, the port openings 64 and 68 respectively as well as the passageway 82 in the plug member 70 have generally the same shape although they differ in cross-sectional area. In other words the passages 62 and 66 and passageway 82 may all be circular such as the passage 66 as shown in FIG. 3 or they may all be non-circular such as an elliptical or oval passage 66 shown in FIG. 4. By such an arrangement the passages 62 and 66 have a critical differential dimension in their maximum widths in a plane transverse to the axis of rotation of the plug member 70. To realize the advantages of the present invention the maximum width W of the passage 66 which opens in the port opening 68 and which has the sealing ring 80 surrounding the port opening in the groove 78 provided in the housing member 52 must be greater than the maximum width W' of the passage 62 and its port opening 64. Of course, the relationship of the widths W and W' can still be made even though the cross-sectional area of the respective passages 66 and 62 are equal to one another. However, in this situation it will be necessary to make one passage circular and the other passage non-circular such as shown in FIGS. 15–17 inclusive or both passages non-circular but having different maximum widths in a plane transverse to the axis of rotation of the plug member 70.

Figure 15:
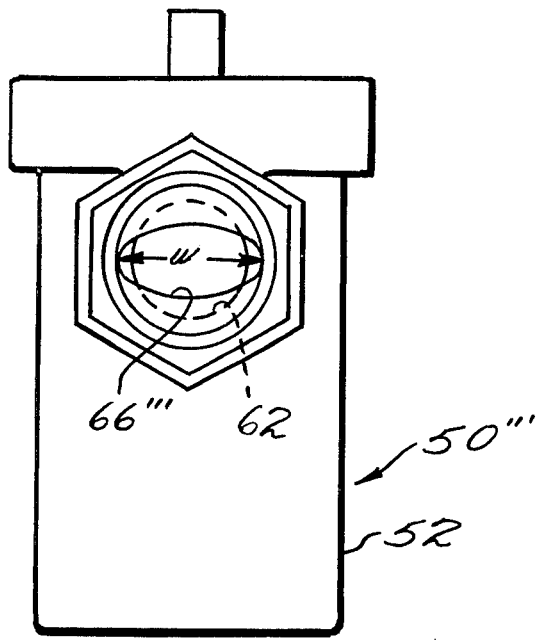
FIG. 15 is an end elevational view, partly in section, of a rotary plug valve, the view illustrating a still further modification of the present invention.
Figure 16:
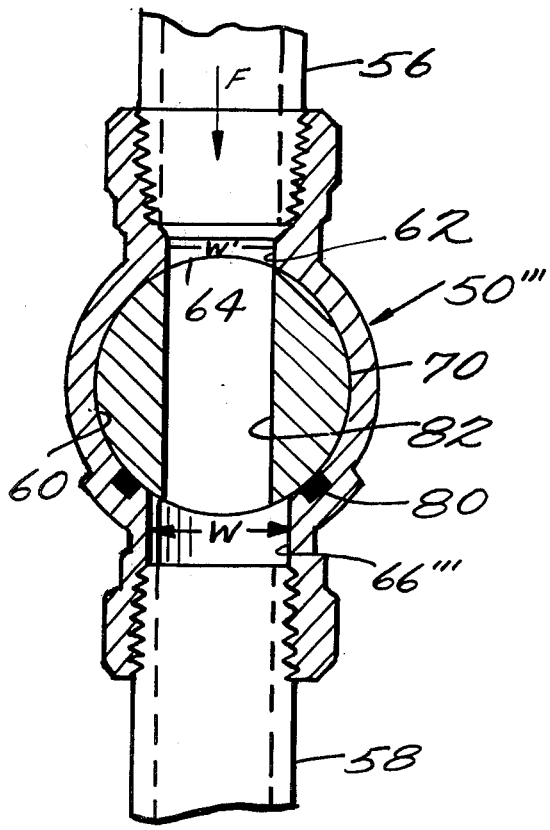
FIG. 16 is a horizontal sectional view through the valve of FIG. 15.
Figure 17:
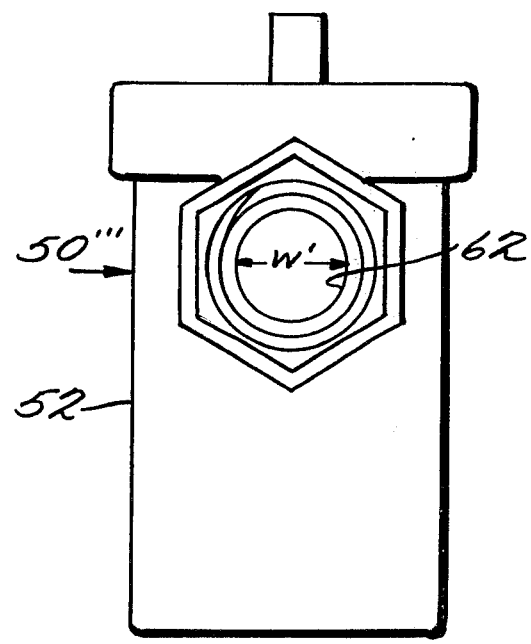
FIG. 17 is an elevational view similar to FIG. 15 but illustrating the opposite side of the valve.

Referring now to FIGS. 15–17, it will be noted that the passage 66''' in the housing member 52 of rotary plug valve assembly 50''' is provided with a width W which is greater than the width W' of the passage 62 of the housing member and this is accomplished by making the passage 66''' non-circular or eliptical, whereas the passage 62 is made circular and of the same cross-sectional area. Of course, it will be understood that by re-orienting the passage 66''' 90°, then it would have the smaller width in a plane transverse to the axis of rotation of the plug member 70 and the sealing ring 80 would have to be positioned around the passage 62 which would now have the wider width W.

Referring now specifically to FIG. 7 the rotary plug valve assembly 50 is shown with its plug member 70 being closed in the direction of the arrow but with the port opening 64 and the port opening 68 still in open communication with the flow passageway 82 in the plug member 70 so that the flow F of fluid is still through the valve assembly. In this condition, it will be noted that the space between the trailing side of the port passageway 82 provides a greater opening with the port opening 68 than the opposite port of the passageway 82 with regard to the port opening 64. This permits flow through the plug member 70 without creating a low pressure area around the outside of the unsupported portion of the sealing ring 80 and of course of the pressure of the fluid is bearing directly on unsupported portion of the sealing ring 80 so that there is no lifting of the sealing ring from the groove 78. Even if the rotary plug valve assembly 50 of FIG. 7 is left in this position as a "throttling" valve no low pressure area across the unsupported portion of the sealing ring 80 will develop to cause problems upon closing.

Referring now to FIG. 8, the rotary plug valve assembly 50 is shown with its plug member 70 rotated toward the fully closed position a slight amount from that shown in FIG. 7 and it will be noted that a metal to metal seal MS has been made around the port opening 64 between the surface of the plug member 70 and the valve seat 60. This stops flow F of fluid from entering the passageway 82 and even though there is still communication between the passageway 82 and the passage 66, there is no harmful effect on the unsupported portion of the sealing ring 80 and fluid in the passageway 82 can continue to bleed off to reduce pressure therein.

FIGS. 7 and 8 represent the normal installation of the rotary plug valve assembly 50 in a fluid pressure line. However, the present invention results in the rotary plug valve assembly being capable of reverse flow through the same and for this purpose, FIGS. 9 and 10 represent the same valve installed into the fluid pressure line so that the inlet pipe 56 communicates with the passage 66 having the width W and the outlet pipe 58 communicates with the passage 62 having the lesser width W'. In FIGS. 9 and 10 the sealing ring 80 is encircling the port opening 68 which has now become an upstream port opening with a port opening 64 becoming a downstream port opening. FIG. 9 discloses the plug member 70 in a similar position to that of FIG. 7 and it will be noted that there is flow through the plug valve assembly 50 but since the space between the trailing side of the port of passageway 82 and the edge of the port opening 68 is greater than the corresponding space between the trailing side of the other port opening of passageway 82 and the port opening 64, no critical flow condition is built up wherein the flow velocity increases to the point which would develop a low pressure area around the sealing ring 80. This view is somewhat similar to the view in FIG. 6 with regard to the prior art arrangement. However, because of the free flow F through the valve there is no increase in velocity of this flow to cause the critical condition found in FIG. 6.

FIG. 10 shows the plug member 70 rotated a slight amount from that of FIG. 9 and here the port of the passageway 82 which was cooperating with the port opening 64 has passed beyond the port opening 64 and the flow of fluid which is still entering the passageway 82 creates a metal to metal seal MS between the plug member 70 and the valve seat 60 around the port opening 64. This preliminarily stops the flow F past the unsupported portion of the sealing ring 80 so that it remains in its groove 78.

The sealing ring 80 is preferably an O-ring made of an elastomeric material such as rubber or rubber-like materials. While the present invention may utilize a sealing ring such as found in the prior art rotary plug valve assemblies having a Shore A Durometer of 70, it has been found that by increasing the Shore A Durometer to 95, or preferably 90, this further maintains the sealing ring in its groove during operation of the valve regardless of whether flow is one way or the other through the valve.

Figure 11:
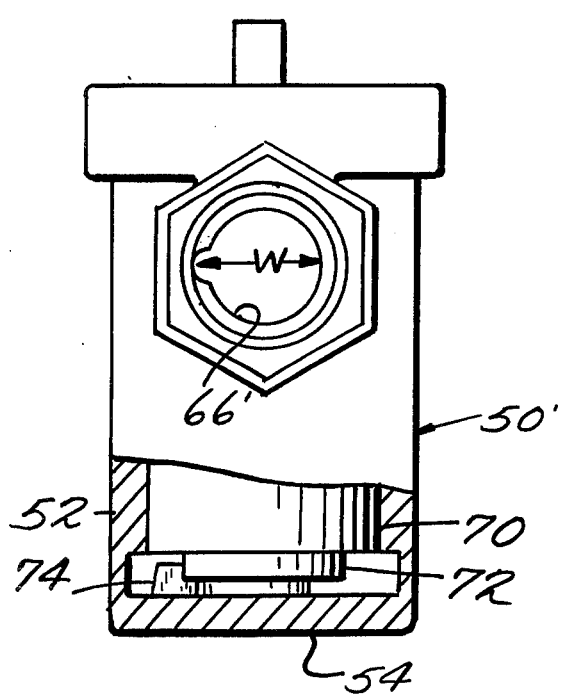
FIG. 11 is an end elevational view, partly in section, of a rotary plug valve of the checked type, the view illustrating a modification of the present invention.
Figure 12:
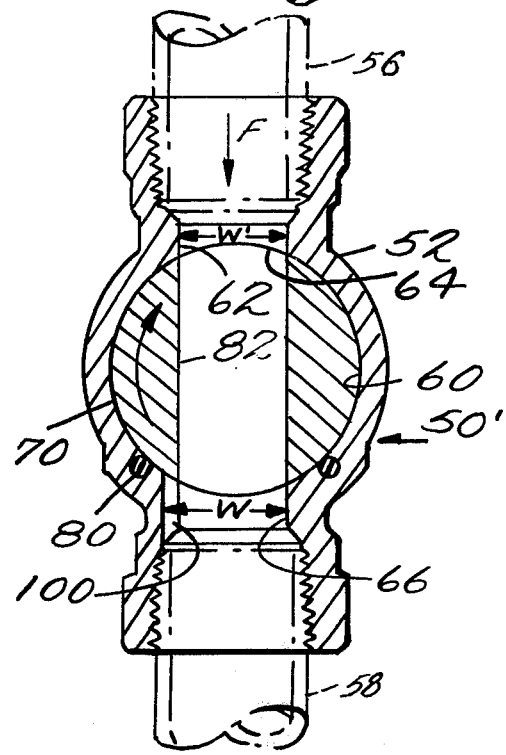
FIG. 12 is a horizontal sectional view of the valve of FIG. 11, the plug member being shown in the fully opened position.

Referring now to FIGS. 11 and 12 there is disclosed a modification of the rotary plug valve assembly 50' wherein the width W of the passage 66' in a plane transverse to the axis of rotation of the plug member 70 is increased over the width W' of the passage 62. In this arrangement a longitudinally extending groove or notch 100 is provided along the side of the passage 66' to which the trailing side of the port of the passageway 82 approaches when the plug member 70 is moved towards the closed position. The rotary plug valve assembly 50' is a "checked" valve in which the plug 70 has the arcuate lug 72 cooperating with an arcuate flange 74 on the integral bottom 54 of the body member 52. The arrangement just described results in the same metal to metal seal MS occurring between the plug member 70 and the seat 60 around the port opening 64 when the valve is being closed prior to the passageway 82 being out of communication with the passageway 66'. This situation is true regardless of whether the valve 50' has flow in one direction or the other.

Figure 13:
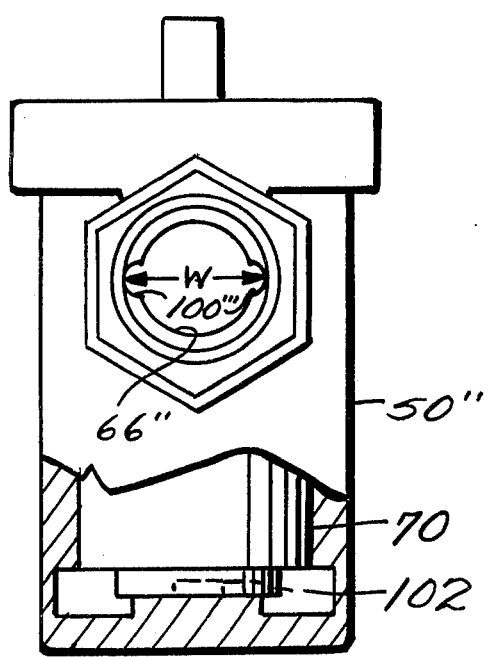
FIG. 13 is an end elevational view similar to FIG. 11 but showing a still further modification thereof with the rotary plug valve being a checkless valve.
Figure 14:
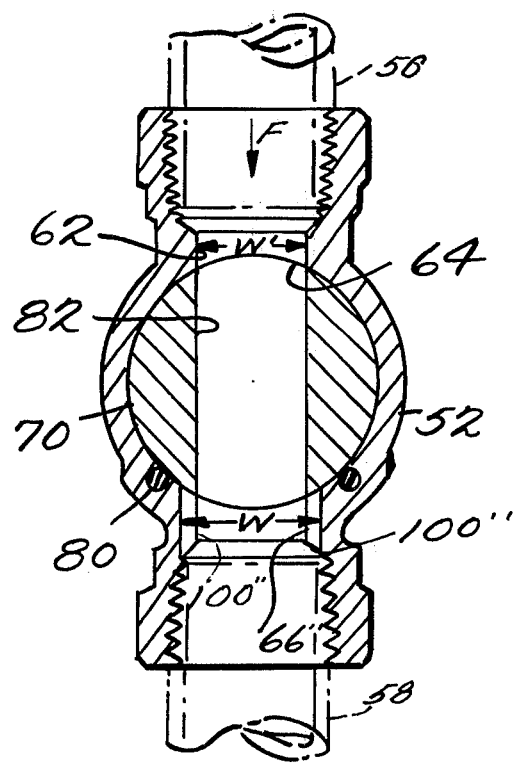
FIG. 14 is a horizontal sectional view through the valve of FIG. 13.

Referring now to FIGS. 13 and 14, the valve 50" is similar to the valve 50' except that it is a "checkless" valve and the plug member 70 can rotate a full 360°. In this respect, the view schematically shows the plug member 70 mounted on a spindle 102 for full 360° rotation. In order to realize the concept of the present invention as described hereinbefore, the passage 66" in the housing member 52 must be provided with two oppositely disposed longitudinally extending grooves or notches so that regardless of which way the plug member 70 is rotated, the trailing side of the port of passageway 82, upon closing, always approaches one of the notches 100" in order that the metal to metal seal MS can be created around the port opening 64 of the passage 62.

The terminology used in this specification is for the purpose of description and not limitation, the scope of the invention being defined in the claims.

What is claimed is:
1. A rotary plug valve capable of having fluid flow therethrough in either direction, said plug valve comprising:
   a housing member having a valve seat therein, a first passage having a port opening to said valve seat and a second passage having a port opening to said valve seat;
   a plug member having a flow passgeway therethrough with ports at its ends, said plug member being rotatable on an axis in said valve seat between a fully opened position wherein the ports of the flow passageway therethrough axially align respectively with said port openings of said first and second passages in said housing member and a closed position where said flow passageway in said plug member is out of alignment with said port openings in said housing member, the ports of said flow passageway having the same shape as each other and each of said ports having the same width in a plane bisecting said flow passageway perpendicular to said axis of rotation of said plug member and each of said ports having the same height in a plane bisecting said flow passageway parallel to said axis of rotation of said plug member;
   sealing means in said valve seat encircling only one of said port openings of said first and second passages in said housing member when said plug member is in the closed position, said sealing means being defined by an endless groove in said valve seat encircling the one of said port openings of said first and second passages in said housing member and an endless sealing ring positioned in said endless groove; and
   the said passage of said housing member which has said sealing means encircling its port opening having a maximum width parallel to a plane transverse to the axis of rotation of said plug member greater than a maximum width of the other passage parallel to the same plane so that when said plug member is rotated towards the said closed position, the one of said ports of said passageway in said plug member which was cooperating with the port opening of said other passage will have passed beyond the same and be covered by said valve seat prior to the trailing side of the other of said ports of said passageway passing the edge of the port opening of said passage having said sealing means surrounding the same and prior to passing an unsupported portion of said sealing ring.

2. A rotary plug valve as claimed in claim 1 in which said passage in said housing member having the greater width also has a cross-sectional area in a plane transverse to the passage axis greater than a cross-sectional area of the other passage of said first and second passages in said housing member.

3. A rotary plug valve as claimed in claim 1 in which said first and second passages in said housing member are circular in cross-sections.

4. A rotary plug valve as claimed in claim 1 in which said first and second passages in said housing member are noncircular in cross-section.

5. A rotary plug valve as claimed in claim 4 in which said first and second passages of said housing member are generally elliptical in cross-section with a major axis parallel to the axis of rotation of said plug member.

6. A rotary plug valve as claimed in claim 1 including means to limit rotation of said plug member between the fully opened and the fully closed positions.

7. A rotary plug valve as claimed in claim 6 in which said passage in said housing member having the greater width has a longitudinally extending notch therein on the side of the same furthest from the trailing side of the port of the passageway through the plug member when the plug member is approaching the fully closed position.

8. A rotary plug valve as claimed in claim 1 in which said plug member rotates 360° and in which said passage of said housing member having the greater width is provided with oppositely disposed longitudinally extending notches therein to define the width of the said passage.

9. A rotary plug valve as claimed in claim 1 in which one of said first and second passages is circular in cross-section and the other of said first and second passages is noncircular in cross-section.

10. A rotary plug valve as claimed in claim 1 in which the ports of said passageway through said plug member have a width in a plane transverse to the axis of rotation of said plug member at least as great as the maximum width of the said other passage in said housing member and no greater than the maximum width of the said passage having the sealing means encircling its port opening.

11. A rotary plug valve as claimed in claim 1 in which said passage in said housing member having the greater width also has a cross-sectional area in a plane transverse to the passage axis greater than a cross-sectional area of the other passage of said first and second passages in said housing member and in which the ports of said passageway in said plug member is similarly shaped in cross-section to the cross-sections of said first and second passages in said housing member and have a cross-sectional area at least as great as the cross-sectional area of the said other passage in said housing member and no greater in cross-sectional area than the said passage in said housing member having the sealing means encircling its port opening.

12. A rotary plug valve as claimed in claim 1 in which said sealing ring is an O-ring having a Shore A Durometer of at least 70.

13. A rotary plug valve as claimed in claim 1 in which said sealing ring is an O-ring having a Shore A Durometer in the range of 70 to 95.

14. A rotary plug valve as claimed in claim 1 in which said sealing ring is an O-ring having a Shore A Durometer of substantially 90.

* * * * *